July 12, 1966　　　C. J. NEWMAN ETAL　　　3,260,559
MIRROR AND VANITY CABINET COMBINATION
Filed Jan. 28, 1965　　　　　　　　　　　2 Sheets-Sheet 1
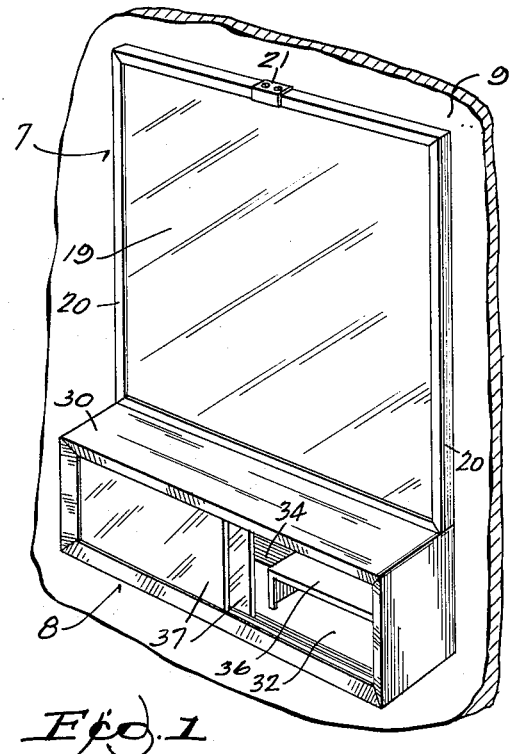
Fig. 1
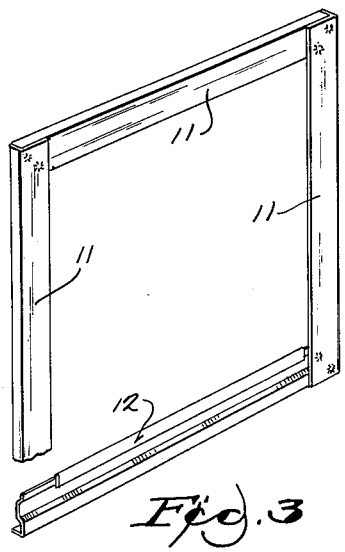
Fig. 3
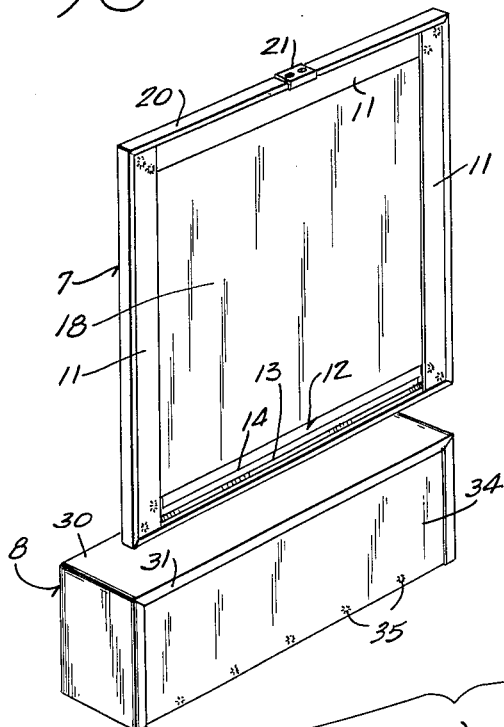
Fig. 2
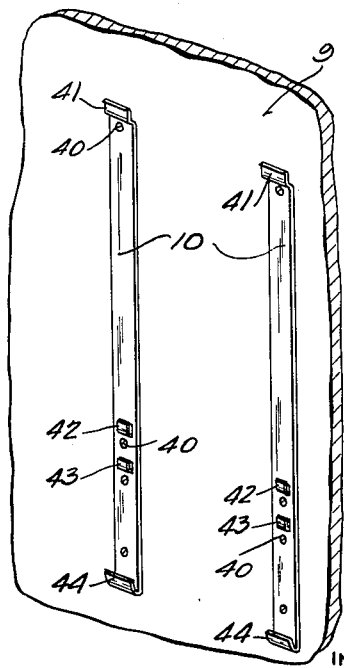
INVENTORS
CHARLES J. NEWMAN
THEODORE F. BIERE
Miles Henninger
ATTORNEY July 12, 1966  C. J. NEWMAN ETAL  3,260,559
MIRROR AND VANITY CABINET COMBINATION
Filed Jan. 28, 1965  2 Sheets-Sheet 2
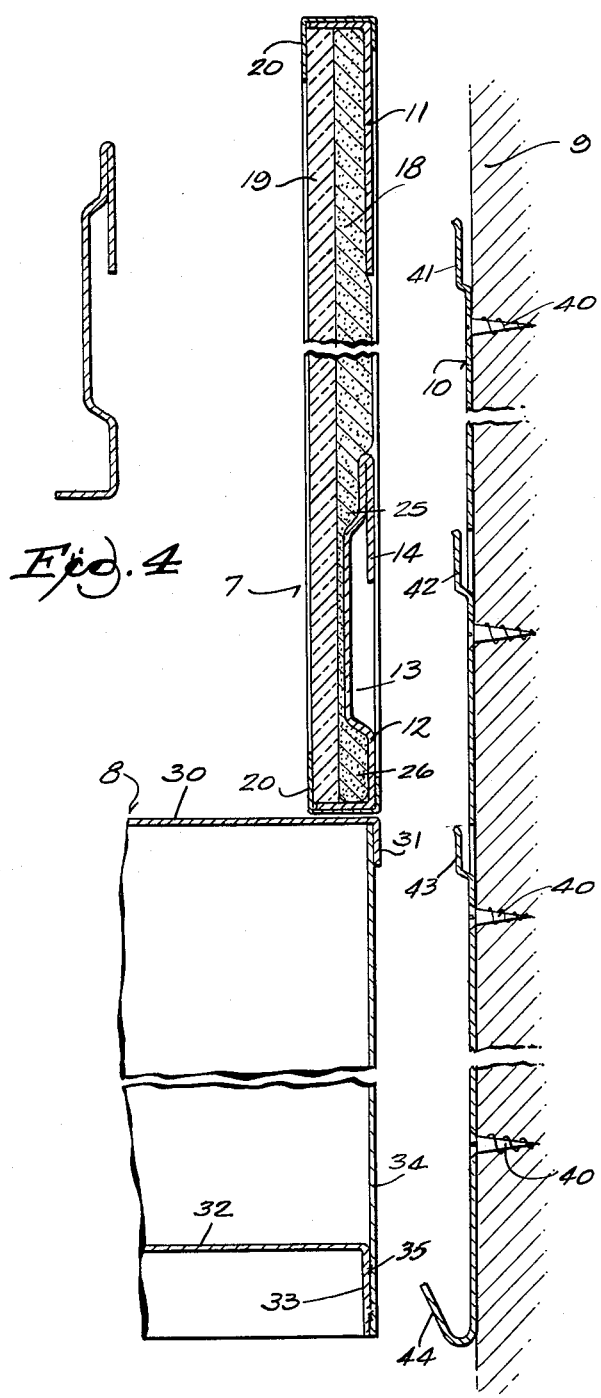
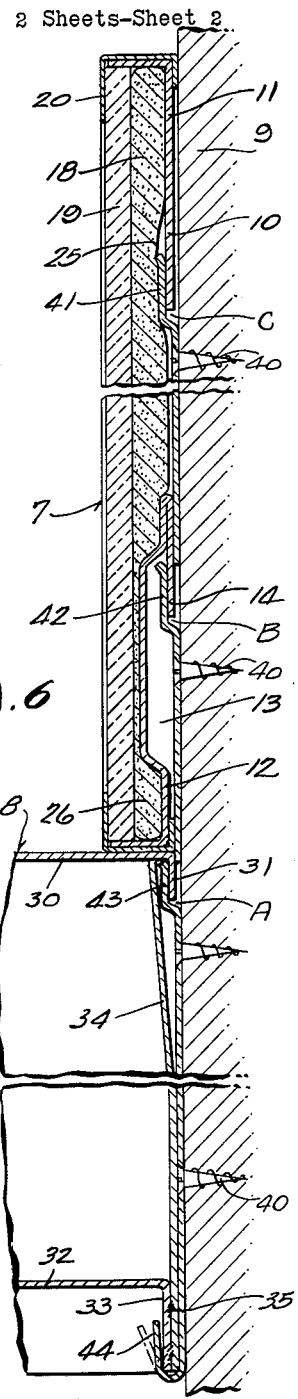
INVENTORS
CHARLES J. NEWMAN
THEODORE F. BIERE
ATTORNEY United States Patent Office 3,260,559
Patented July 12, 1966

3,260,559
MIRROR AND VANITY CABINET COMBINATION
Charles J. Newman and Theodore F. Biere, Madison, Ind., assignors to Grote Manufacturing Company, Madison, Ind., a corporation of Kentucky
Filed Jan. 28, 1965, Ser. No. 428,749
3 Claims. (Cl. 312—224)

This invention relates to improvements in mirror and vanity cabinet combinations to be mounted on a vertical wall and particularly to a construction in which a pair of identical brackets serve for mounting both the cabinet and the mirror tightly against the wall.

Modern lavatories, comfort stations, restrooms and the like require relatively large mirrors and relatively small cabinets in which articles may be placed temporarily while the mirror or the washbasin or the like is being used. The cabinets and mirrors should be placed as tightly as possible against a wall consistent with ease and speed of mounting and in removal when repair or replacement of any part is required. Hence the wall brackets on which the cabinet and the mirror are hung, should extend a minimum distance from the wall and the greater part of the bracket thickness should be received in the cabinet and in the mirror construction. The wall brackets should be capable of mounting on a wall in minimum time and with minimum of operations, while retaining ease of hanging the cabinet and the mirror on such brackets.

In the present construction, the wall brackets are identical metal straps with the ends of the strap bent over to provide an end hook at each end of the strap while hook-like parts are punched out intermediate the ends of the strap, and all the hooks extending to one side of the strap. Some of the bracket hooks engage the upper edge of the cabinet or the mirror while others of the hooks engage a hanger which is part of the mirror, and a lower edge of the cabinet. The wall brackets are attached to a wall, as by a number of screws, in substantially parallel position and at a spacing less than the width of the mirror and the length of the cabinet whereby one rail of the mirror frame and a single hanger structure forming part of the mirror can, respectively, engage an end hook and an intermediate hook of each of two wall brackets, and the edges of the cabinet can engage two pairs of other hooks on the wall brackets. The hanger for the mirror is recessed within the mirror frame and the hooks of the wall brackets also engage within the mirror and cabinet structures so that only the thickness of the bracket strap has any material effect on the closeness of the mounted cabinet and mirror to the wall.

In the drawings:

FIG. 1 is a perspective view of a mirror and a cabinet on a fragment of a wall.

FIG. 2 is an "exploded" view of the structure of FIG. 1, to illustrate the relationship of the frame and mirror hanger and the cabinet rear edges to the wall brackets.

FIG. 3 is a perspective view of the frame for the mirror with a portion thereof broken away to show the lower frame rail and the hanger in cross section.

FIG. 4 is an enlarged view of the hanger hook forming a part of the mirror construction.

FIG. 5 is an enlarged vertical section of the mirror and cabinet prior to mounting thereof on the wall bracket also in section, and FIG. 6 is a section similar to FIG. 5 but with the mirror and cabinet hung on the brackets.

Referring specifically to the drawings, a framed glass mirror generally designated 7 and a cabinet generally designated 8, are to be mounted on a building wall 9 by a pair of generally identical brackets designated 10, the brackets being formed and placed to be substantially concealed when the cabinet and mirror are mounted thereon. The mirror 7 has a metal frame comprising top and side rails 11 which are simple L-shaped metal strips and a bottom rail and hanger 12 which is also generally L-shaped but which has a portion 13 thereof bent inwardly to form a recess within the frame and an end hook 14, all four of the frame members being joined at the corners to receive a backing sheet 18 for cushioning a sheet of glass 19 with a reflective surface and for particularly protecting the reflective surface on the glass. After the backing 18 and glass 19 are placed in the frame, a one-piece channel-like member 20 is fitted about the edges of the frame and the ends of the edging are joined to one another by a connector piece 21. The backing 18 is compressible in parts as is indicated at 25 and 26 in FIG. 6.

The cabinet 8 is preferably made of sheet metal with at least its top 30 flanged as indicated at 31 and its bottom 32 flanged as indicated at 33. A cabinet back 34 extends inside the top flange 31 but is not attached thereto and abuts against the top 30, and the back 34 extends outside and over the full width of the bottom flange 33 and is attached thereto as indicated by spot welds 35 along its length. The cabinet provides a shelf 36 and has two doors 37 sliding in grooves in the cabinet top and bottom.

Two identical brackets 10 are fixed to the building wall 9 as by screws 40. Each bracket is a strip of sheet metal from which are formed hooks 41, 42, 43 and 44 which are similar in shape, but which top and bottom hooks 41 and 44 are slightly longer. Intermediate hooks 42 and 43 are punched out of the straps and are therefore only a portion of the width of the straps. All of the hooks 41-44 extend away from the straps for the same distance and the greater portion of the hooks are actually recessed within the mirror frame and the cabinet. Hence the cabinet and the mirror frame bear on the bracket straps between the hooks and are spaced from the wall no farther than the thickness of the straps. Further, the mirror frame bottom rail and hanger 12 is so set that the thickness of the frame side rails provides some space for the strap portion of the brackets 10 and allows the mirror frame to approach the wall surface closely.

In mounting the mirror and the cabinet, the brackets are placed parallel on the wall with the hooks upwards and at any lateral spacing within the distance inside the side rails of the mirror frame. The height of the brackets from the floor is determined by measurement to the end of the hook 43 which determines the level of the cabinet top 30. When both brackets are in place, the cabinet is placed by pressing its back 34 (below the flange 31 on the cabinet top 30) against the ends of the hooks 43 to spring the back inward and allow the hooks to slide upward along the back of the cabinet until the cabinet top flange 31 rests in the hooks. At the same time the bracket bottom hooks 44 receive the cabinet bottom flange 33 and the lower edge of the back 34. Thereafter the mirror backing 18 is pressed against the upper bracket hooks 41 to pass such hooks between the mirror top rail 11 and the backing 18 while the intermediate hooks 42 receive the edge of the mirror hanger 12–14. The mirror is allowed to slide down on its four hooks until it is seated on the top of the cabinet and the bracket hooks 41, 42 only partially support the mirror. The spacing of hooks 41–44 is such as to secure particular bearing relationships thereon of mirror 7 and the cabinet 8, for the purpose of bringing the mirror lower frame edge into bearing closely on the top of the cabinet and thereby give the appearance of a unitary structure while preserving the ease of mounting described above. Referring particularly to FIG. 6, hook 43 is of a depth to receive the cabinet top flange 31 with slight clearance at A when the cabinet top 30 bears on the upper end of the hook 43. At that time hook 44 receives the bottom and back cabinet flanges 33 and 35 with slight clearance. Such clearance is taken up by bending the hook 44 from the dotted line position to the full line position shown in FIG. 6 at which the hook bears on flanges 33 and 35 and the cabinet 8 is thus rigidly positioned on the brackets 10. Thereafter the hook 41 is slipped under the mirror top rail 11 and the hook 42 is engaged under the mirror bottom rail hook 14. The hooks 41, 42 bear laterally on the mirror frame parts engaged thereby so that a slight pressure usually has to be exerted to slide the mirror down until its edging channel 20 bears on the cabinet top 30. At that time there are clearances at B and at C between the hooks 41 and the cabinet mirror frame parts. Sufficient of the mirror's weight is borne by the cabinet to minimize the joint between them but the lateral friction between the hooks 41, 42 and the mirror frame parts cooperating therewith prevent transmission of excessive weight to the cabinet. Thus the appearance of a unitary structure is achieved while retaining adequate weight distribution on the brackets. It has been found that a person who is not a craftsman and who has only ordinary skill with hand tools can hang a mirror and cabinet as described in less than five minutes.

We claim:

1. A wall mounted combination cabinet and mirror comprising a pair of wall brackets for attachment in generally parallel relation on a wall, the bracket ends each being bent to form end hooks and the brackets each having a pair of struck-out portions intermediate the end hooks to form an upper and a lower intermediate hook, a cabinet having flanges engageable by two of the hooks on each bracket for holding the cabinet in substantially fixed position, and a mirror comprising a reflective glass, a compressible backing for the glass, a channel-shaped frame including side rails and a top rail for receiving the glass and a hook hanger forming a bottom rail for the mirror frame and extending the full width of the mirror between the side rails, the upper bracket end hooks being insertible between the mirror backing and the frame top rail and the upper intermediate bracket hooks being engageable with the hanger hook for sliding the mirror into bearing position on the cabinet top.

2. The wall mounted combination cabinet and mirror of claim 1 in which said flanges are on top and bottom walls of said cabinet and a back is attached to the bottom wall flange and with the upper edge thereof free from the cabinet top, the lower intermediate hook of each pair of brackets being insertible between the cabinet top flange and the cabinet back for bearing of the cabinet top on the hook ends, the lower bracket end hooks receiving the cabinet bottom and the cabinet back flanges and bearing thereon up bending of the end hooks toward closed position.

3. The wall mounted combination cabinet and mirror of claim 1 in which the bracket hooks are spaced vertically to engage and hold the cabinet substantially rigidly by use of lower intermediate hook and the lower end hook of each bracket and the mirror is slidable downwardly on the upper end hook and the upper intermediate hook of the brackets to bear on the top of the cabinet whereby the mirror is supported in part by the brackets and in part by the cabinet.

References Cited by the Examiner

UNITED STATES PATENTS

| | | | |
|---|---|---|---|
| 1,569,459 | 1/1926 | Colbert et al. | 88—92 |
| 1,790,977 | 2/1931 | De Boer | 206—19.5 |
| 2,986,282 | 5/1961 | Brink | 211—90 |
| 3,001,748 | 9/1961 | Austin | 248—28 |

FOREIGN PATENTS

| | | |
|---|---|---|
| 645,001 | 10/1950 | Great Britain. |
| 338,164 | 6/1959 | Switzerland. |

CLAUDE A. LE ROY, *Primary Examiner.*

CHANCELLOR E. HARRIS, *Assistant Examiner.*